(12) United States Patent
Miess et al.

(10) Patent No.: US 8,741,007 B1
(45) Date of Patent: Jun. 3, 2014

(54) METHODS OF FABRICATING THERMALLY-STABLE POLYCRYSTALLINE DIAMOND ELEMENTS AND COMPACTS

(71) Applicant: US Synthetic Corporation, Orem, UT (US)

(72) Inventors: David P. Miess, Highland, UT (US); Craig H. Cooley, Saratoga Springs, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 13/655,185

(22) Filed: Oct. 18, 2012

Related U.S. Application Data

(63) Continuation of application No. 13/291,463, filed on Nov. 8, 2011, now Pat. No. 8,312,943, which is a continuation of application No. 12/389,882, filed on Feb. 20, 2009, now Pat. No. 8,074,748.

(51) Int. Cl.
*B24D 3/34* (2006.01)
*B24D 3/14* (2006.01)
*B01J 3/06* (2006.01)

(52) U.S. Cl.
USPC .............................................. 51/295; 175/434

(58) Field of Classification Search
USPC ................ 51/307, 309, 295; 175/428, 434
See application file for complete search history.

(56) References Cited

U.S. PATENT DOCUMENTS

| | | | |
|---|---|---|---|
| 4,017,347 | A | 4/1977 | Cleaveland |
| 4,556,403 | A | 12/1985 | Almond et al. |
| 4,664,705 | A | 5/1987 | Horton et al. |
| 5,769,176 | A | 6/1998 | Sumiya et al. |
| 6,066,585 | A | 5/2000 | Swartz |
| 6,716,275 | B1 | 4/2004 | Reed et al. |
| 8,074,748 | B1 | 12/2011 | Miess et al. |
| 2004/0035167 | A1* | 2/2004 | Lugovskoy et al. .............. 72/60 |
| 2005/0263328 | A1 | 12/2005 | Middlemiss |
| 2008/0115424 | A1 | 5/2008 | Can et al. |
| 2008/0209818 | A1* | 9/2008 | Belnap et al. .................. 51/307 |
| 2008/0223623 | A1 | 9/2008 | Keshavan et al. |
| 2008/0242787 | A1 | 10/2008 | Kim et al. |
| 2009/0173015 | A1 | 7/2009 | Keshavan et al. |
| 2010/0115855 | A1 | 5/2010 | Middlemiss |
| 2010/0122852 | A1* | 5/2010 | Russell et al. ................ 175/428 |
| 2010/0155149 | A1 | 6/2010 | Keshavan et al. |
| 2010/0181585 | A1* | 7/2010 | Juestel et al. .................. 257/98 |
| 2010/0239483 | A1 | 9/2010 | Middlemiss |
| 2011/0023377 | A1 | 2/2011 | DiGiovanni |

OTHER PUBLICATIONS

U.S. Appl. No. 13/291,463, filed Nov. 8, 2011, Miess et al.
David Stauth, News & Communication Services, Oregon State University, "New compound reveals more secrets, potential", Jan. 2, 1997.
Abstract of Chemistry of Materials, "Zirconium Tungstate / Polyimide Nanocomposites Exhibiting Reduced Coefficient of Thermal Expansion", Chem. Mater., 2005 17 (8), pp. 2136-2141.
Ernest G. Wolff, "Introduction to the Dimensional Stability of Composite Materials", 2004, Overview, p. 20.
Schneider, et al.; Engineered Materials Handbook, vol. 4, "Ceramics and Glasses", ASM International, 1991; pp. 1102-1103.
Aremo Products, Inc.; Valley Cottage, New York; www.aremco.com; Product Brochure, Jan. 2008; pp. 1-46.
U.S. Appl. No. 12/389,882, filed May 27, 2011, Office Action.
U.S. Appl. No. 12/389,882, filed Apr. 7, 2011, Office Action.
U.S. Appl. No. 12/389,882, filed Sep. 20, 2011, Notice of Allowance.
U.S. Appl. No. 12/389,882, filed Nov. 22, 2011, Issue Notification.
U.S. Appl. No. 13/291,463, filed Apr. 25, 2012, Office Action.
U.S. Appl. No. 13/291,463, filed Jul. 23, 2012, Notice of Allowance.
U.S. Appl. No. 13/916,798, filed Jun. 13, 2013, Miess et al.
U.S. Appl. No. 13/916,798, Feb. 21, 2014, Office Action.

\* cited by examiner

*Primary Examiner* — Pegah Parvini
(74) *Attorney, Agent, or Firm* — Dorsey & Whitney LLP

(57) ABSTRACT

Embodiments of the invention relate to thermally-stable polycrystalline diamond ("PCD") elements, polycrystalline diamond compacts ("PDCs"), and methods of fabricating such PCD elements and PDCs. In an embodiment, a method of fabricating a thermally-stable PCD element includes providing an at least partially leached PCD body including a plurality of interstitial regions, and infiltrating at least a portion of the interstitial regions of the at least partially leached PCD body with at least a portion of an infiltrant material. The infiltrant material may include at least one member chosen from the group of glass, silicone, and a ceramic having a negative coefficient of thermal expansion.

25 Claims, 9 Drawing Sheets

METHODS OF FABRICATING THERMALLY-STABLE POLYCRYSTALLINE DIAMOND ELEMENTS AND COMPACTS

CROSS-REFERENCE TO RELATED APPLICATIONS

This application is a continuation of U.S. application Ser. No. 13/291,463 filed on 8 Nov. 2011, which is a continuation of U.S. application Ser. No. 12/389,882 filed on 20 Feb. 2009 (now U.S. Pat. No. 8,074,748), the contents of which are incorporated herein, in their entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may also be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented-carbide substrate into a container with a volume of diamond particles positioned on a surface of the cemented-carbide substrate. A number of such containers may be loaded into an HPHT press. The substrate(s) and volume of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of a matrix of bonded diamond grains having diamond-to-diamond bonding therebetween, with interstitial regions between the bonded diamond grains being occupied by the solvent catalyst.

The presence of the solvent catalyst in the PCD table is believed to reduce the thermal stability of the PCD table at elevated temperatures. For example, the difference in thermal expansion coefficient between the diamond grains and the solvent catalyst is believed to lead to chipping or cracking of the PCD table during drilling or cutting operations, which consequently can degrade the mechanical properties of the PCD table or cause failure. Additionally, some of the diamond grains can undergo a chemical breakdown or back-conversion to graphite via interaction with the solvent catalyst. At elevated high temperatures, portions of diamond grains may transform to carbon monoxide, carbon dioxide, graphite, or combinations thereof, causing degradation of the mechanical properties of the PCD table.

One conventional approach for improving the thermal stability of PDCs is to at least partially remove the solvent catalyst from the PCD table of the PDC by acid leaching. In another conventional approach for forming a PDC, a sintered PCD table may be separately formed and then leached to remove the solvent catalyst from interstitial regions between bonded diamond grains. The leached PCD table may be simultaneously HPHT bonded to a cemented-carbide substrate and infiltrated with silicon in a separate HPHT process. The silicon may infiltrate the interstitial regions of the leached PCD table from which the solvent catalyst has been leached and react with the diamond grains to form silicon carbide. However, pure silicon may reduce the strength of the bond between the PCD table and the cemented-carbide substrate, and cause other processing problems.

Despite the availability of a number of different PDCs, manufacturers and users of PDCs continue to seek PDCs that exhibit improved toughness, wear resistance, and/or thermal stability.

SUMMARY

Embodiments of the invention relate to thermally-stable PCD elements, PDCs, and methods of fabricating such PCD elements and PDCs. In an embodiment, a PCD element includes a PCD body comprising bonded diamond grains defining a plurality of interstitial regions. The PCD body further includes a first volume having a first portion of the interstitial regions and a second volume having a second portion of the interstitial regions. An infiltrant is disposed in the first portion of the interstitial regions of the first volume and the second portion of the interstitial regions of the second volume is substantially free of the infiltrant. The infiltrant comprises a glass, a glass-ceramic, a thermal decomposition reaction product of silicone, silicone, a ceramic having a negative coefficient of thermal expansion, or combinations thereof.

In an embodiment, a PDC includes a substrate and a thermally-stable PCD table bonded to the substrate. The PCD table includes bonded diamond grains defining a plurality of interstitial regions. The PCD table further includes a first volume remote from the substrate having an infiltrant disposed interstitially between the bonded diamond grains thereof and a second volume adjacent to the substrate having a metal-solvent catalyst disposed interstitially between the bonded diamond grains thereof. The infiltrant comprises a glass, a glass-ceramic, a thermal decomposition reaction product of silicone, silicone, a ceramic having a negative coefficient of thermal expansion, or combinations thereof.

In an embodiment, a method of manufacturing a thermally-stable PCD element includes positioning an infiltrant material adjacent to a surface of an at least partially leached PCD body including a plurality of interstitial regions. The infiltrant material includes a glass, silicone, a ceramic having a negative coefficient of thermal expansion, or combinations thereof. The method further includes infiltrating at least a portion of the infiltrant material through the surface and into only a portion of the interstitial regions of the at least partially leached PCD body. In one embodiment, a PDC may be fabricated by placing the at least partially leached PCD table between the substrate and the infiltrant material, and subjecting the combination to an HPHT process.

In an embodiment, a method of forming a thermally-stable PDC includes providing a PDC comprising an at least partially leached PCD table including a plurality of interstitial regions and bonded to a substrate. The method further includes infiltrating at least a portion of the interstitial regions of the at least partially leached PCD table with an infiltrant material comprising a glass, silicone, a ceramic having a negative coefficient of thermal expansion, or combinations thereof.

Other embodiments include applications utilizing the disclosed PCD elements and PDCs in various articles and apparatuses, such as rotary drill bits, bearing apparatuses, wire-drawing dies, machining equipment, and other articles and apparatuses.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to thermally-stable PCD elements, PDCs, and methods of fabricating such PCD elements and PDCs. The disclosed PCD elements comprise a first volume including a glass, a glass-ceramic, silicone, a thermal decomposition reaction product of silicone, a ceramic having a negative coefficient of thermal expansion, or combinations thereof to provide a thermally-stable working region, and a second volume that has been infiltrated with a metal-solvent catalyst for bonding to a substrate or a braze alloy for bonding to a matrix-type bit body of a rotary drill bit. The PCD elements and PDCs disclosed herein may be used in a variety of applications, such as rotary drill bits, bearing apparatuses, wire-drawing dies, machining equipment, and other articles and apparatuses.

Figure 1:
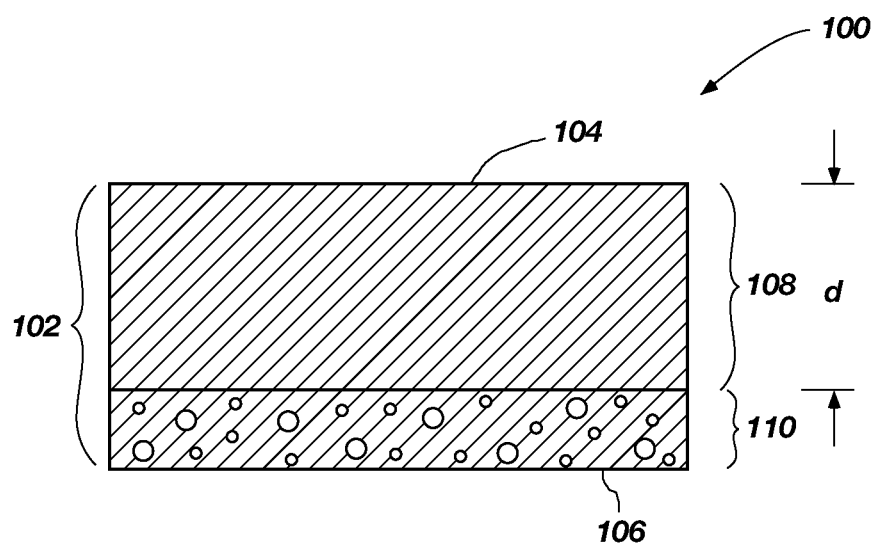
FIG. 1 is a cross-sectional view of an embodiment of a thermally-stable PCD element.

FIG. 1 is a cross-sectional view of an embodiment of a thermally-stable PCD element 100 that may be used as PCD cutting element. The PCD element 100 comprises a PCD body 102 including a plurality of bonded diamond grains having diamond-to-diamond bonding therebetween. The plurality of bonded diamond grains defines a plurality of interstitial regions. The PCD body 102 includes a working upper surface 104 and an opposing back surface 106. The PCD body 102 includes a first volume 108 having a first portion of the interstitial regions, with the first volume 108 extending from the upper surface 104 to an intermediate depth d within the PCD body 102. The PCD body 102 includes a second volume 110 having a second portion of the interstitial regions, with the second volume 110 extending inwardly from the back surface 106. Although the upper surface 104 is illustrated as being substantially planar, the upper surface may be nonplanar (e.g., convex or concave) and a working region of the PCD body 102 may include peripheral portions of the first volume 108.

In an embodiment, the intermediate depth d to which the first volume 108 extends may be about the entire thickness of the PCD body 102. In another embodiment, the intermediate depth d may be about 50 μm to about 500 μm, such as about 200 μm to about 400 μm.

An infiltrant, including a glass, a glass-ceramic, silicone, a thermal decomposition reaction product of silicone, a ceramic having a negative coefficient of thermal expansion, or combinations thereof, is disposed in the first portion of the interstitial regions of the PCD body 102. The infiltrant is generally non-catalytic relative to diamond so that at elevated temperatures the infiltrant does not promote chemical breakdown or back-conversion of the diamond grains to graphite, carbon monoxide, and/or carbon dioxide, which results in degradation of the mechanical properties of the PCD element 100. The interstitial regions of the second volume 110 of the PCD body 102 may be substantially free of the infiltrant.

Suitable glasses for the infiltrant include, but are not limited to, a silicate glass, a borate glass, a phosphate glass, a borosilicate glass, and combinations of any of the foregoing glasses. For example, the infiltrant may comprise sodium silicate, zirconium silicate, lithium silicate, sodium borosilicate, zirconium borosilicate, lithium borosilicate, lithium aluminosilicate, or combinations thereof. In some embodiments, any of the foregoing glasses may be reinforced with a filler made from ceramic particles. For example, the ceramic particles may include, but are not limited to, boron nitride particles, titanium diboride particles, zirconium oxide particles, and combinations of the foregoing ceramic particles.

Suitable glass-ceramics for the infiltrant include, but are not limited to, a silicate glass, a borate glass, a phosphate glass, a borosilicate glass, and combinations of any of the foregoing glasses that include beta spodumene ("$LiAlSi_2O_6$") and/or beta eucryptite ("$LiAlSi_4O_{10}$") as a constituent. Other glass-ceramics include a silicate glass, a borate glass, a phosphate glass, a borosilicate glass, an aluminosilicate glass, and combinations of any of the foregoing glasses that have been partially crystallized.

The infiltrant may also include or may be made from a ceramic having a negative coefficient of thermal expansion. One suitable ceramic having a negative coefficient of thermal expansion is zirconium tungstate, which contracts continuously over a temperature range from −272° C. to about 775° C. Previously-mentioned ceramics having a negative coefficient of thermal expansion are beta spodumene and beta eucryptite. Furthermore, combinations of zirconium tungstate, beta spodumene, and beta eucryptite may also be employed. By providing an infiltrant that exhibits a negative to a small positive coefficient of thermal expansion, thermal stresses and/or thermal damage (e.g., breaking diamond-to-diamond bonds) may be reduced as the temperature of the PCD element 100 increases during use (e.g., during cutting a subterranean formation during drilling) compared to when the infiltrant is metallic, such as a metal-solvent catalyst.

The infiltrant occupying the first portion of the interstitial regions of the first volume 108 may also include silicone, a thermal decomposition reaction product of silicone, or combinations thereof. As will become apparent from reading the following description of methods for fabricating the PCD element 100, the thermal decomposition reaction product of silicone is a by-product of a silicone-based infiltrant that has been infiltrated into the PCD body 102 during a process at a temperature sufficient to at least partially thermally decompose the silicone-based infiltrant, such as an HPHT process or a HIP process.

The second volume 110 of the PCD body 102 is substantially free of the infiltrant. Depending upon the particular application for the PCD element 100, the second portion of the interstitial regions of the second volume 110 may include a metal-solvent catalyst for bonding to a substrate (not shown) or a braze alloy used to braze the second volume 110 to a matrix-type bit body (not shown) of a rotary drill bit.

Figure 2:
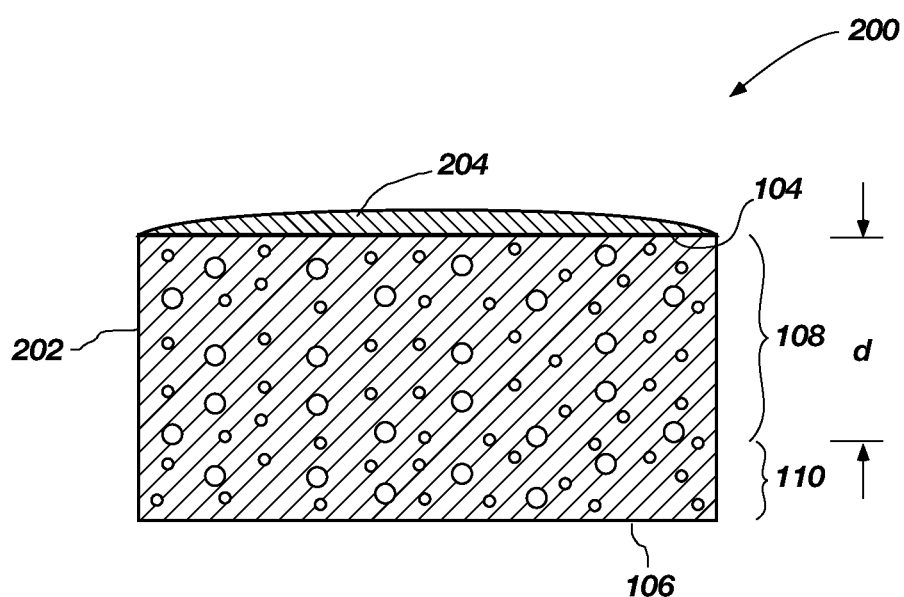
FIG. 2 is a cross-sectional view of an assembly to be processed under HPHT conditions or using a hot isostatic pressing ("HIP") process to form the PCD element shown in FIG. 1 according to an embodiment of method.

FIG. 2 is a cross-sectional view of an assembly 200 to be processed under HPHT conditions or using a HIP process to form the PCD element 100 shown in FIG. 1 according to an embodiment of method. Referring to FIG. 2, an at least partially leached PCD body 202 may be provided that includes the upper surface 104 and the opposing back surface 106. The at least partially leached PCD body 202 includes a plurality of bonded diamond grains defining a plurality of interstitial regions that were previously occupied by a metal-solvent catalyst (e.g., cobalt, nickel, iron, or alloys thereof) used to sinter the diamond particles. The plurality of interstitial regions forms a network of at least partially interconnected pores that extend between the upper surface 104 and the back surface 106.

A layer 204 of infiltrant material may be positioned adjacent to the upper surface 104 to form the assembly 200, such as by coating the upper surface 104 with the infiltrant material or disposing the infiltrant material in the bottom of a container and placing the at least partially leached PCD body 202 in the container and in contact with the infiltrant material. In some embodiments, the infiltrant material of the layer 204 may be in particulate form, a solid, in a liquid solution, a paste, or any other form that is capable of infiltrating into the interstitial regions of the at least partially leached PCD body 202.

Suitable infiltrant materials for the layer 204 include high-temperature specialty coatings commercially available from Aremco of Valley Cottage, N.Y. For example, Aremco-Seal™ 613 and 617 are two suitable glass-based high-temperature specialty coatings commercially available from Aremco. As another example, Aremco-Cerama-Dip™ 538N is a suitable zirconium silicate-based high-temperature specialty coating commercially available from Aremco. Another suitable high-temperature specialty coating commercially available from Aremco is Aremco-Seal™ 529, which is a silicone-based coating. Any of the foregoing high-temperature specialty coatings commercially available from Aremco may be brushed onto the upper surface 104 of the at least partially leached PCD body 202 and/or brushed into a container in which the at least partially leached PCD body 202 is disposed. Other suitable infiltrant materials include, but are not limited to, glass powders, such as particles of sodium silicate, zirconium silicate, lithium silicate, sodium borosilicate, zirconium borosilicate, lithium borosilicate, lithium aluminosilicate, and mixtures thereof.

The at least partially leached PCD body 202 and the layer 204 of infiltrant material may be placed in a pressure transmitting medium, such as a refractory metal can embedded in pyrophyllite or other gasket medium. The pressure transmitting medium, including the at least partially leached PCD body 202 and layer 204 of infiltrant material, may be subjected to an HPHT process using an ultra-high pressure press to create temperature and pressure conditions at which diamond is stable. The temperature of the HPHT process may be at least about 1000° C. (e.g., about 1200° C. to about 1600° C.) and the pressure of the HPHT process may be at least 4.0 GPa (e.g., about 5.0 GPa to about 8.0 GPa) for a time sufficient to infiltrate the at least partially leached PCD body 202 with the infiltrant material. For example, the pressure of the HPHT process may be about 5 GPa to about 7 GPa and the temperature of the HPHT process may be about 1150° C. to about 1400° C. (e.g., about 1200° C. to about 1300° C.).

During the HPHT process, infiltrant material from the layer 204 infiltrates into the first volume 108 of the at least partially leached PCD body 202 generally to the intermediate depth d to fill a first portion of the interstitial regions thereof and form the PCD element 100 as illustrated in FIG. 1. The first portion of first volume 108 of the PCD body 202 extends from the upper surface 104 to the intermediate depth d therewithin. The amount of infiltrant material in the layer 204 and the HPHT process conditions (e.g., time, temperature, and/or pressure) are selected so that the infiltrant material only infiltrates into the first volume 108 of the at least partially leached PCD body 202 to the intermediate depth d. The second volume 110 of the infiltrated PCD body 202 remains substantially free of the infiltrant.

The HPHT process may also chemically modify the infiltrant material of the layer 204. For example, various solvents included in the infiltrant material may evaporate at the high temperature employed in the HPHT process. Some of the glass-based infiltrant materials may partially crystallize to form a glass-ceramic during the HPHT process. When the infiltrant material is a silicone-based material, the resultant infiltrant in the first volume 108 may include silicone, a thermal decomposition reaction product of silicone formed as a result of the high-temperature employed in the HPHT process, or combinations thereof.

As discussed with respect to FIG. 1, if desired, the PCD element 100 so-formed may be brazed to another structure, such as a matrix-type bit body of a rotary drill bit, using a brazing process. In such an embodiment, a suitable braze alloy may be placed between the PCD element 100 and the bit body, and subjected to a braze cycle to cause the braze alloy to melt and infiltrate into the second portion of the interstitial regions in the second volume 110 of the PCD element 100. Upon cooling a strong brazed joint may be formed due to the metallurgical bond between the second volume 110 of the PCD element 100 and the bit body.

The at least partially leached PCD body 202 shown in FIG. 2 may be fabricated by subjecting a plurality of diamond particles to an HPHT sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles or infiltrated from a metal-solvent catalyst foil or powder adjacent to the diamond particles. The bonded diamond grains define interstitial regions, with the metal-solvent catalyst disposed within the interstitial regions. The diamond particles may exhibit a single-mode diamond particle size distribution, or a bimodal or greater diamond particle size distribution. The as-sintered PCD body may be leached by immersion in an acid, such as aqua regia, nitric acid, hydrofluoric acid, or subjected to another suitable process to remove at least a portion of the metal-solvent catalyst from the interstitial regions of the PCD body and form the at least partially leached PCD body 202. For example, the as-sintered PCD body may be immersed in the acid for about 2 to about 7 days (e.g., about 3, 5, or 7 days) or for a few weeks (e.g., about 4 weeks) depending on the process employed.

The plurality of diamond particles sintered to form the at least partially leached PCD body 202 may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 $\mu$m and 20 $\mu$m). More particularly, in various embodiments, the plurality of diamond particles may include a portion exhibiting a relatively larger size (e.g., 100 $\mu$m, 90 $\mu$m, 80 $\mu$m, 70 $\mu$m, 60 $\mu$m, 50 $\mu$m, 40 $\mu$m, 30 $\mu$m, 20 $\mu$m, 15 $\mu$m, 12 $\mu$m, 10 $\mu$m, 8 $\mu$m) and another portion exhibiting at least one relatively smaller size (e.g., 30 $\mu$m, 20 $\mu$m, 10 $\mu$m, 15 $\mu$m, 12 $\mu$m, 10 $\mu$m, 8 $\mu$m, 4 $\mu$m, 2 $\mu$m, 1 $\mu$m, 0.5 $\mu$m, less than 0.5 $\mu$m, 0.1 $\mu$m, less than 0.1 $\mu$m). In another embodiment, the plurality of diamond particles may include a portion exhibiting a relatively larger size between about 40 $\mu$m and about 15 $\mu$m and another portion exhibiting a relatively smaller size between about 12 $\mu$m and 2 $\mu$m. Of course, the plurality of diamond particles may also comprise three or more different sizes (e.g., one relatively larger size and two or more relatively smaller sizes) without limitation.

Instead of infiltrating the at least partially leached PCD body 202 in an HPHT process, in another embodiment, the infiltrant material of the layer 204 may be infiltrated into the at least partially leached PCD body 202 using a HIP process that employs significantly lower pressure. In such an embodiment, the temperature of the HIP process should be kept sufficiently low and/or the process time sufficiently short so that the diamond grains of the at least partially leached PCD body 202 are not significantly degraded.

Figure 3:
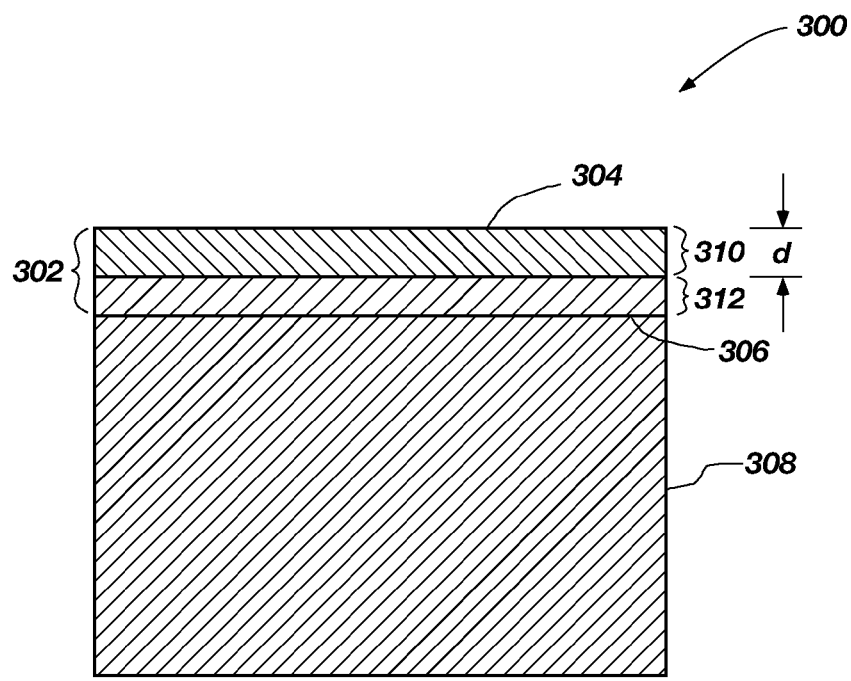
FIG. 3 is a cross-sectional view of an embodiment of a thermally-stable PDC.

FIG. 3 is a cross-sectional view of an embodiment of a PDC 300. The PDC 300 includes a thermally-stable PCD table 302 having a working upper surface 304 and an opposing interfacial surface 306. The interfacial surface 306 of the PCD table 302 is bonded to a substrate 308. The substrate 308 may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. For example, in one embodiment, the substrate 308 comprises cobalt-cemented tungsten carbide. Although the interfacial surface 306 of the PCD table 302 is depicted in FIG. 3 as being substantially planar, the interfacial surface 306 may exhibit a selected nonplanar topography.

The PCD table 302 includes a plurality of bonded diamond grains having diamond-to-diamond bonding therebetween. The plurality of bonded diamond grains defines a plurality of interstitial regions. The PCD table 302 includes a first volume 310 remote from the substrate 308 that extends from the upper surface 304 to an indeterminate depth d within the PCD table 302. The first volume 310 includes a first portion of the interstitial regions. A second volume 312 of the PCD table 302 adjacent to the substrate 308 includes a second portion of the interstitial regions.

In an embodiment, the intermediate depth d to which the first volume 310 extends may be about the entire thickness of the PCD table 302. In another embodiment, the intermediate depth d may be about 50 $\mu$m to about 500 $\mu$m, such as about 200 $\mu$m to about 400 $\mu$m.

Any of the previously described infiltrants, such as a glass, a glass-ceramic, silicone, a thermal decomposition reaction product of silicone, a ceramic having a negative coefficient of thermal expansion, or combinations thereof may occupy the first portion of the interstitial regions of the PCD table 302. Because the infiltrant is generally non-catalytic relative to diamond, the first volume 310 of the PCD table 302 provides a relatively thermally-stable working region compared to the second volume 312. Although PCD table 302 is illustrated as having a substantially planar upper surface 304, the upper surface may be nonplanar (e.g., convex or concave) and include peripheral portions of the first volume 310. The second volume 312 of the PCD table 302 may be infiltrated with a metal-solvent catalyst infiltrated from the substrate 308, such as cobalt from a cobalt cemented tungsten carbide substrate, or other source. The infiltrated metal-solvent catalyst from the substrate 308 provides a strong metallurgical bond between the interfacial surface 306 of the PCD table 302 and the substrate 308.

In one embodiment, the PCD table 302 may be a pre-sintered PCD table that is bonded to the substrate 308 subsequent to being formed. In another embodiment, the PCD table 302 may be integrally formed with the substrate 308 by placing diamond powder adjacent to the substrate 308, subjecting the combination to an HPHT process, and substantially removing metal-solvent catalyst in the PCD table so-formed using a leaching process.

Figure 4:
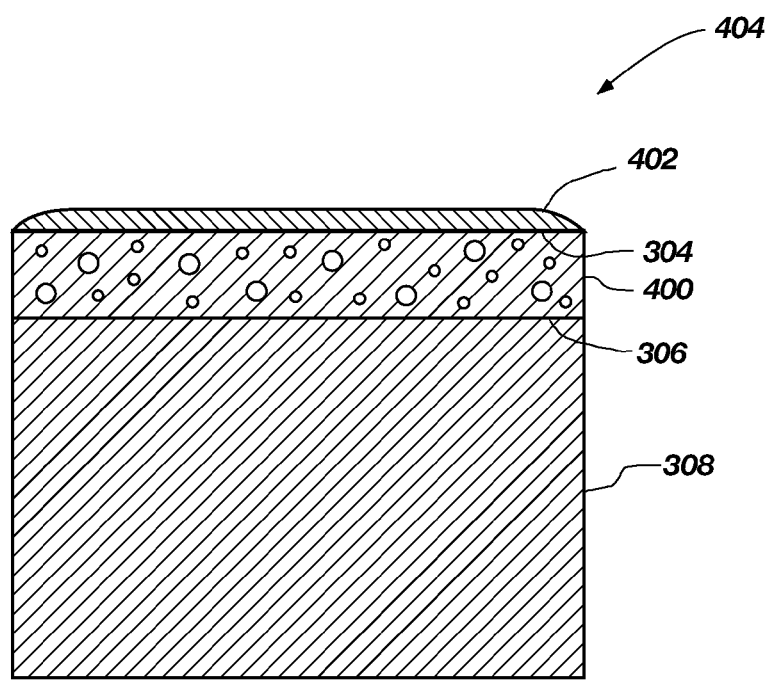
FIG. 4 is a cross-sectional view of an assembly to be HPHT processed to form the PDC shown in FIG. 3 according to an embodiment of method.

FIG. 4 is a cross-sectional view of an assembly 404 to be HPHT processed to form the PDC shown in FIG. 3 according to an embodiment of method. An at least partially leached PCD table 400 may be positioned between a layer 402 of infiltrant material and the substrate 308 to form an assembly 404. The at least partially leached PCD table 400 may exhibit the same or similar structure as the at least partially leached PCD body 202 shown in FIG. 2 and may fabricated in the same fashion. The infiltrant material may be selected from one or more of the infiltrant materials used for the infiltrant material of the layer 204 shown in FIG. 2. The layer 402 may be applied to the upper surface 304 of the at least partially leached PCD table 402, and the interfacial surface 306 of the at least partially leached PCD table 400 may be positioned adjacent to the substrate 308. The assembly 404 may be enclosed in a suitable pressure transmitting medium and subjected to an HPHT process to form the PDC 300 (FIG. 3) using the same or similar HPHT conditions previously discussed with respect to HPHT processing the assembly 200 shown in FIG. 2.

During the HPHT process, the lower melting infiltrant material of the layer 402 infiltrates into a first portion of the interstitial regions of the at least partially leached PCD table 400. Depending upon the particular infiltrant material employed, any of the previously described infiltrants (e.g., a glass, a glass-ceramic, a silicone, a thermal decomposition reaction product of silicone, a ceramic having a negative coefficient of thermal expansion, or combinations thereof) may occupy the first portion of the interstitial regions of the at least partially leached PCD table 400. The metal-solvent catalyst of the substrate 308 liquefies at a higher temperature, and infiltrates subsequent to infiltration of the infiltrant material of the layer 402 and into a second portion of the interstitial regions of the at least partially leached PCD table 400 so that a strong metallurgical bond is formed between the substrate 308 and the interfacial surface 306 upon cooling. The infiltrant that occupies the first portion of the interstitial regions substantially blocks or at least limits further infiltration into the at least partially leached PCD table 400 by the metal-solvent catalyst.

In an embodiment, when the infiltrant material of the layer 402 is made predominately from a glass (e.g., a borosilicate-based glass) and the substrate 308 is a cobalt-cemented carbide substrate, the infiltrant material flows and infiltrates into the at least partially leached PCD table 400 at or slightly above about 800° C. and cobalt-cemented carbide substrate from the substrate 308 liquefies and sweeps into the at least partially leached PCD table 400 at around about 1490° C.

In an embodiment, the metal-solvent catalyst may also be provided from an intermediate layer disposed between the at least partially leached PCD table 400 and the substrate 308. The intermediate layer may include any of the aforementioned metal-solvent catalysts. For example, the intermediate layer may include a plurality of metal-solvent catalyst particles, or a thin foil or plate made from the metal-solvent catalyst.

In other embodiments, the at least partially leached PCD table 400 is infiltrated with the infiltrant material from the layer 402 to a selected depth in a first HPHT or HIP process and is subsequently bonded to the substrate 308 by brazing, using a separate HPHT bonding process, or another suitable joining technique, without limitation.

Figure 5A:
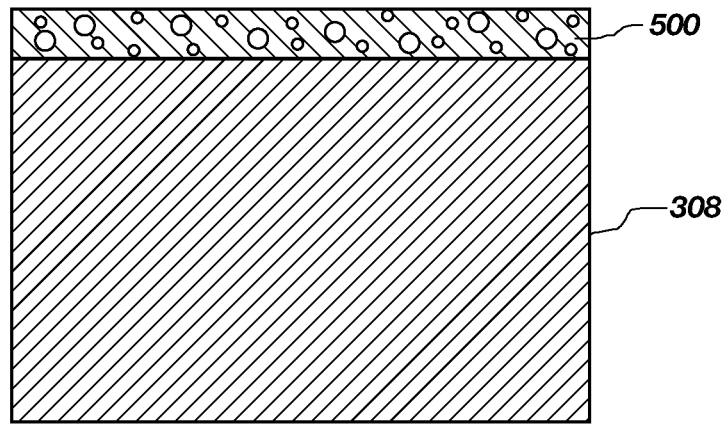
FIGS. 5A through 5D are cross-sectional views at various stages during a method of fabricating the PDC shown in FIG. 3 according to an embodiment of method.
Figure 5B:
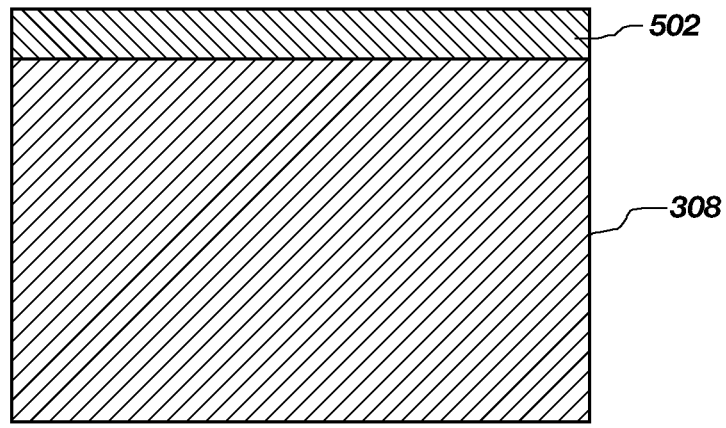

FIGS. 5A through 5D are cross-sectional views at various stages during a method of fabricating the PDC 300 shown in FIG. 3 according to another embodiment of method. Referring to FIG. 5A, a plurality of diamond particles (i.e., diamond powder) may be placed adjacent to the substrate 308. Referring to FIG. 5B, subjecting the diamond particles 500 and the substrate 308 to an HPHT process sweeps metal-solvent catalyst from the substrate 308 into the diamond particles 500 to catalyze formation of a PCD table 502 therefrom that is integrally formed and bonded to the substrate 308. The PCD table 502 comprises bonded diamond grains defining a plurality of interstitial regions in which the swept-in metal-solvent catalyst is disposed.

Figure 5C:
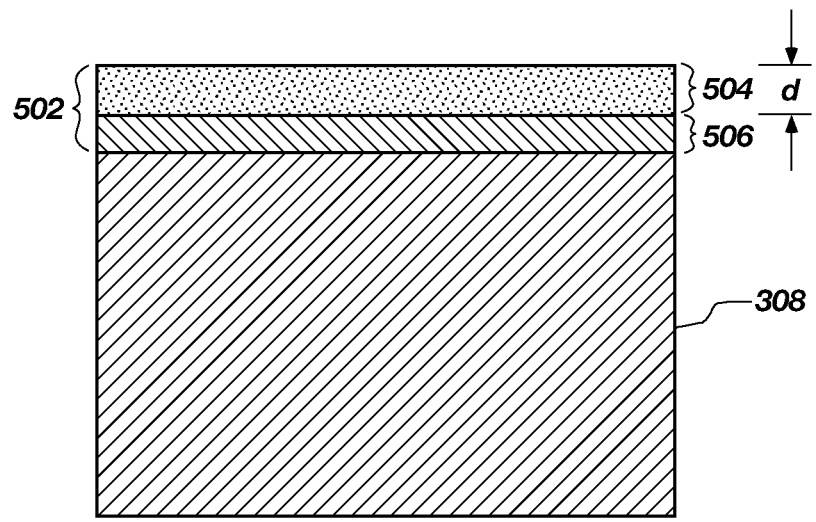

Referring to FIG. 5C, the metal-solvent catalyst interstitially disposed between the bonded diamond grains of the PCD table 502 may be substantially removed to a selected depth d using a leaching process to form an at least partially leached region 504 remote from the substrate 308. For example, the PCD table 502 may be exposed to an acid, such as aqua regia, nitric acid, hydrofluoric acid, or subjected to another suitable process to substantially remove the metal-solvent catalyst and form the at least partially leached region 504. Region 506 of the PCD table 502 adjacent to the substrate 308 still includes the swept-in metal-solvent catalyst from the substrate 308 disposed interstitially between bonded diamond grains.

Figure 5D:
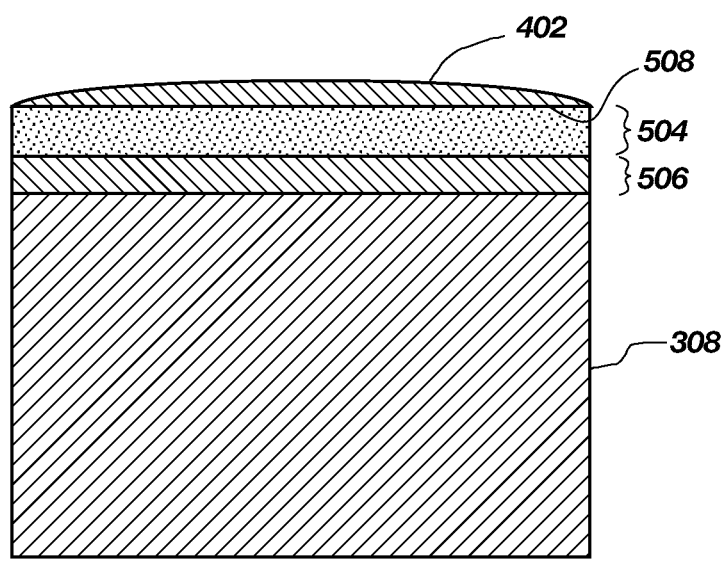

Referring to FIG. 5D, a layer 402 of infiltrant material may be placed adjacent to a working upper surface 508 of the PCD table 502 and infiltrated into the interstitial regions of the at least partially leached region 504 using another HPHT process or a HIP process to form the PDC 300 shown in FIG. 3. The temperature of the HPHT or HIP process may be selected to be less than a temperature at which the metal-solvent catalyst in the region 506 of the PCD table 502 or the substrate 308 partially liquefies to prevent re-infiltration of the at least partially leached region 504 with the metal-solvent catalyst.

The following working examples set forth various formulations for forming PDCs. In the following working examples, the thermal stability of conventional working examples 1 through 3 is compared to the thermal stability of working examples 4 through 7 of the invention.

Comparative Example 1

A conventional PDC was obtained that was fabricated by placing a layer of diamond particles having an average particle size of about 19 μm adjacent to a cobalt-cemented tungsten carbide substrate. The layer and substrate were placed in a container assembly. The container assembly including the layer and substrate therein were subjected to HPHT conditions in an HPHT press at a temperature of about 1400° C. and a pressure of about 5 GPa to about 8 GPa to form a conventional PDC including a PCD table integrally formed and bonded to the substrate. Cobalt was infiltrated into the layer of diamond particles from the substrate catalyzing the formation of the PCD table. The thickness of the PCD table of the PDC was about 0.095 inch and an about 0.011-inch chamfer was machined in the PCD table.

The thermal stability of the PCD table of the conventional PDC so-formed of comparative example 1 was evaluated by measuring the distance cut in a Barre granite workpiece prior to failure, without using coolant, in a vertical turret lathe test. The distance cut is considered representative of the thermal stability of the PCD table. The test parameters were a depth of cut for the PDC of about 1.27 mm, a back rake angle for the PDC of about 20 degrees, an in-feed for the PDC of about 1.524 mm/rev, a cutting speed of the workpiece to be cut of about 1.78 msec, and the workpiece had an outer diameter of about 914 mm and an inner diameter of about 254 mm. The conventional PDC of comparative example 1 was able to cut a distance of about 1715 linear feet in the workpiece prior to failure.

Comparative Example 2

A PDC was obtained that was fabricated as performed in comparative example 1. The thickness of the PCD table of the PDC was about 0.09155 inch and an about 0.01285-inch chamfer was machined in the PCD table. Then, the PCD table was acid leached to a depth of about 87 μm. The thermal stability of the PCD table of the conventional PDC so-formed of comparative example 2 was evaluated by measuring the distance cut prior to failure in the same Barre granite workpiece used to test comparative example 1 and using the same test parameters, without using coolant, in a vertical turret lathe test. The conventional PDC of comparative example 2 was able to cut a distance of about 3453 linear feet in the workpiece prior to failure.

Comparative Example 3

A PDC was obtained that was fabricated as performed in comparative example 1. The thickness of the PCD table of the PDC was about 0.097 inch and an about 0.0122-inch chamfer was machined in the PCD table. The PCD table was acid leached to a depth of greater than about 200 μm. The thermal stability of the PCD table of the conventional PDC so-formed of comparative example 3 was evaluated by measuring distance cut prior to failure in the same Bane granite workpiece used to test comparative example 1 and using the same test parameters, without using coolant, in a vertical turret lathe test. The conventional PDC of comparative example 3 was able to cut a distance of about 8508 linear feet in the workpiece prior to failure.

Example 4

A leached PDC was obtained that was fabricated as performed in comparative example 3. The thickness of the PCD table of the leached PDC was 0.090 inch and a 0.0122-inch chamfer was machined in the PCD table. A layer of infiltrant material made from an Aremco-Seal™ 613 coating was disposed in the bottom of a container assembly. The leached PDC was placed in the container assembly, with the leached PCD table placed adjacent to the layer of Aremco-Seal™ 613 coating. The container assembly including the layer of Aremco-Seal™ 613 coating and the leached PDC therein was subjected to HPHT conditions in an HPHT press at a temperature of about 1200° C. and a pressure of about 5 GPa to about 8 GPa to infiltrate the leached portion of the PCD table with the infiltrant material from the layer. The thermal stability of the infiltrated PCD table of the PDC so-formed of example 4 was evaluated by measuring the distance cut prior to failure in the same Barre granite workpiece used to test comparative example 1 and using the same test parameters, without using coolant, in a vertical turret lathe test. The infiltrated PCD table of the PDC of example 4 was able to cut a distance of greater than 10,422 linear feet in the workpiece prior to failure, which was greater than the distance that the leached PDC of comparative example 3 was able to cut.

Example 5

A leached PDC was obtained that was fabricated as performed in comparative example 3. The thickness of the PCD table of the leached PDC was about 0.089 inch and an about 0.0118-inch chamfer was machined in the PCD table. A layer of infiltrant material made from an Aremco-Seal™ 613 coating was disposed in the bottom of a container assembly. The leached PDC was placed in the container assembly, with the leached PCD table placed adjacent to the layer of Aremco-Seal™ 613 coating. The container assembly including the layer of Aremco-Seal™ 613 coating and the leached PDC therein was subjected to HPHT conditions in an HPHT press at a temperature of about 1300° C. and a pressure of about 5 GPa to about 8 GPa to infiltrate the leached portion of the PCD table with the infiltrant material from the layer. The thermal stability of the infiltrated PCD table of the PDC so-formed of example 5 was evaluated by measuring the distance cut prior to failure in the same Barre granite workpiece used to test comparative example 1 and using the same test parameters, without using coolant, in a vertical turret lathe test. The infiltrated PCD table of the PDC of example 5 was able to cut a distance of about 4864 linear feet in the workpiece prior to failure, which was greater than the distances that the leached PCD tables of comparative examples 1 and 2 were able to cut.

Example 6

A leached PDC was obtained that was fabricated as performed in comparative example 3. The thickness of the PCD table of the leached PDC was about 0.091 inch and an about 0.0118-inch chamfer was machined in the PCD table. A layer of infiltrant material made from an Aremco-Seal™ 617 coating was disposed in the bottom of a container assembly. The leached PDC was placed in the container assembly, with the leached PCD table placed adjacent to the layer of Aremco-Seal™ 617 coating. The container assembly including the layer of Aremco-Seal™ 617 coating and the leached PDC therein was subjected to HPHT conditions in an HPHT press at a temperature of about 1300° C. and a pressure of about 5 GPa to about 8 GPa to infiltrate the leached portion of the PCD table with the infiltrant material from the layer. The thermal stability of the infiltrated PCD table of the PDC so-formed of example 6 was evaluated by measuring the distance cut prior to failure in the same Barre granite workpiece used to test comparative example 1 and using the same test parameters, without using coolant, in a vertical turret lathe test. The infiltrated PCD table of the PDC of example 6 was able to cut a distance of about 4030 linear feet in the workpiece prior to failure, which was greater than the distances that the leached PCD tables of comparative examples 1 and 2 were able to cut.

Example 7

A leached PDC was obtained that was fabricated as performed in comparative example 3. The thickness of the PCD table of the leached PDC was about 0.091 inch and an about 0.0119-inch chamfer was machined in the PCD table. A layer of infiltrant material made from an Aremco-Seal™ 617 coating was disposed in the bottom of a container assembly. The leached PDC was placed in the container assembly, with the leached PCD table placed adjacent to the layer of Aremco-Seal™ 617 coating. The container assembly including the layer of Aremco-Seal™ 617 coating and the leached PDC therein was subjected to HPHT conditions in an HPHT press at a temperature of about 1200° C. and a pressure of about 5 GPa to about 8 GPa to infiltrate the leached portion of the PCD table with the infiltrant material from the layer. The thermal stability of the infiltrated PCD table of the PDC so-formed of example 6 was evaluated by measuring the distance cut prior to failure in the same Barre granite workpiece used to test comparative example 1 and using the same test parameters, without using coolant, in a vertical turret lathe test. The infiltrated PCD table of the PDC of example 7 was able to cut a distance of about 7236 linear feet in the workpiece prior to failure, which was greater than the distances that the leached PCD tables of comparative examples 1 and 2 were able to cut.

Figure 8:
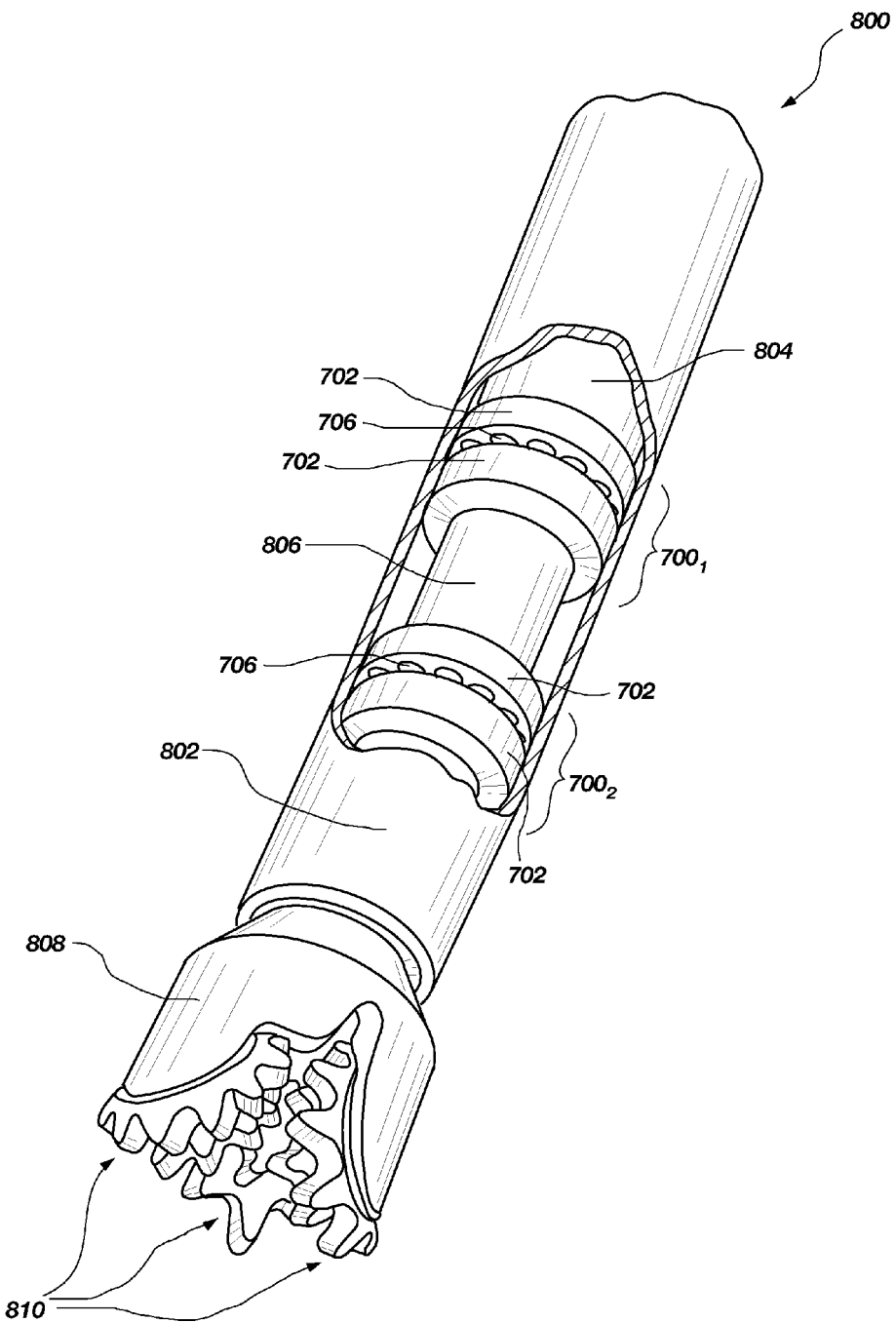
FIG. 8 is a schematic isometric cut-away view of an embodiment of a subterranean drilling system including the thrust-bearing apparatus shown in FIG. 7.
Figure 9:
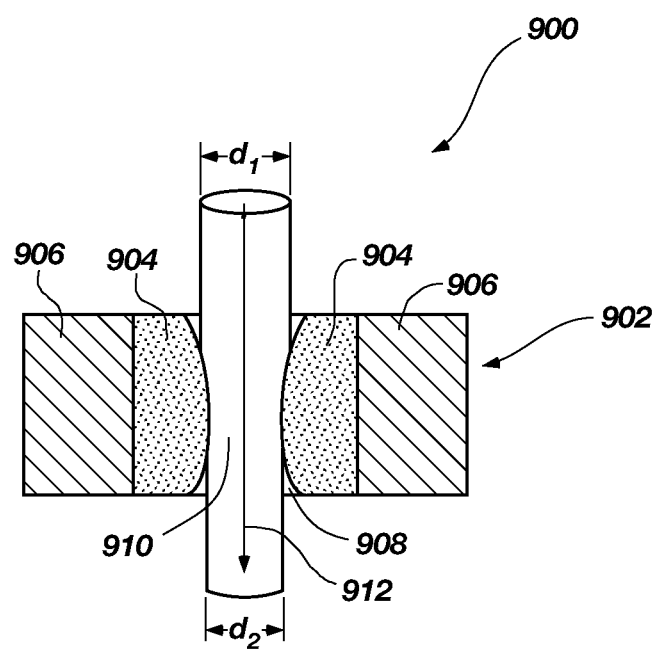
FIG. 9 is a side cross-sectional view of an embodiment of a wire-drawing die that employs a PDC/PCD element fabricated in accordance with the principles described herein.

The disclosed PCD element and PDC embodiments may be used in a number of different applications including, but not limited to, use in a rotary drill bit (FIGS. 6A and 6B), a thrust-bearing apparatus (FIG. 7), a subterranean drilling system (FIG. 8), and a wire-drawing die (FIG. 9). The various applications discussed above are merely some examples of applications in which the PCD element and PDC embodiments may be used. Other applications are contemplated, such as employing the disclosed PCD element and PDC embodiments in friction stir welding tools.

Figure 6A:
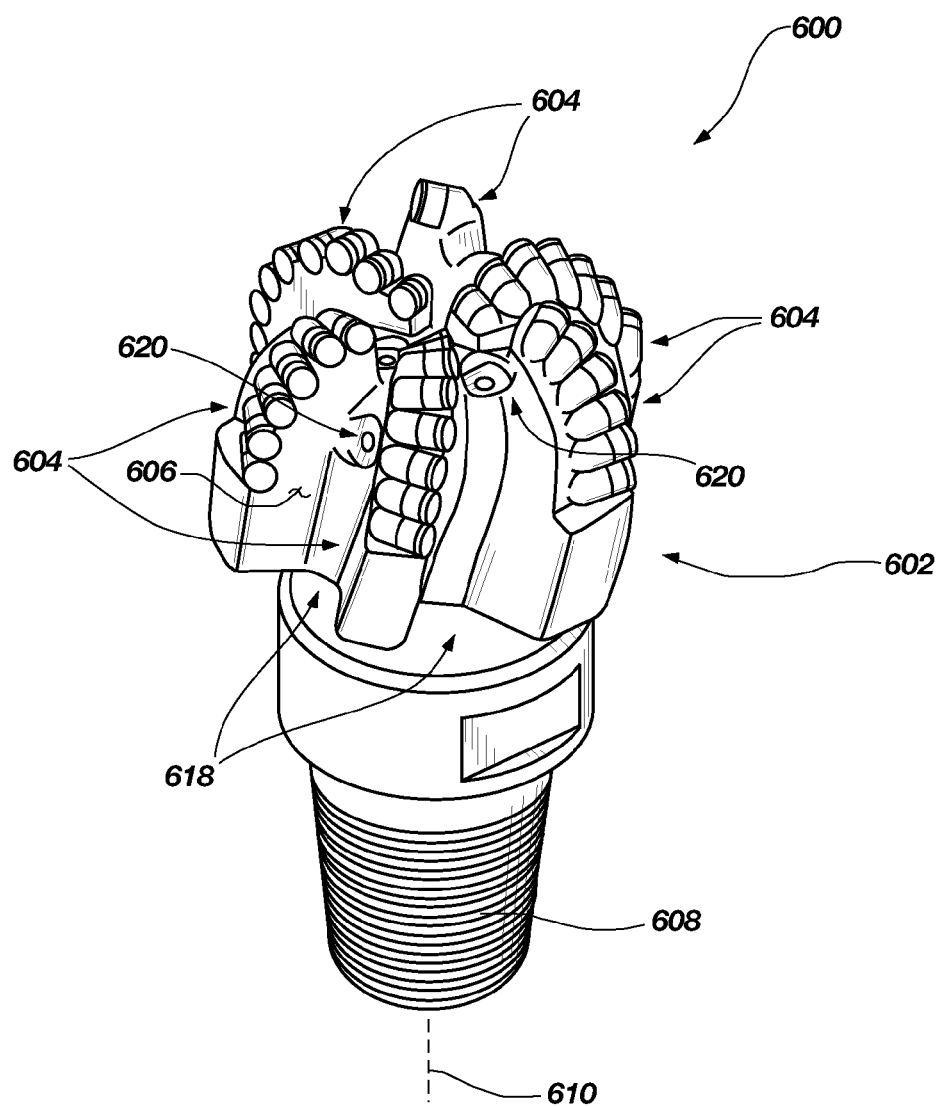
FIG. 6A is an isometric view of an embodiment of a rotary drill bit that may employ one or more of the disclosed PDC/PCD element embodiments.
Figure 6B:
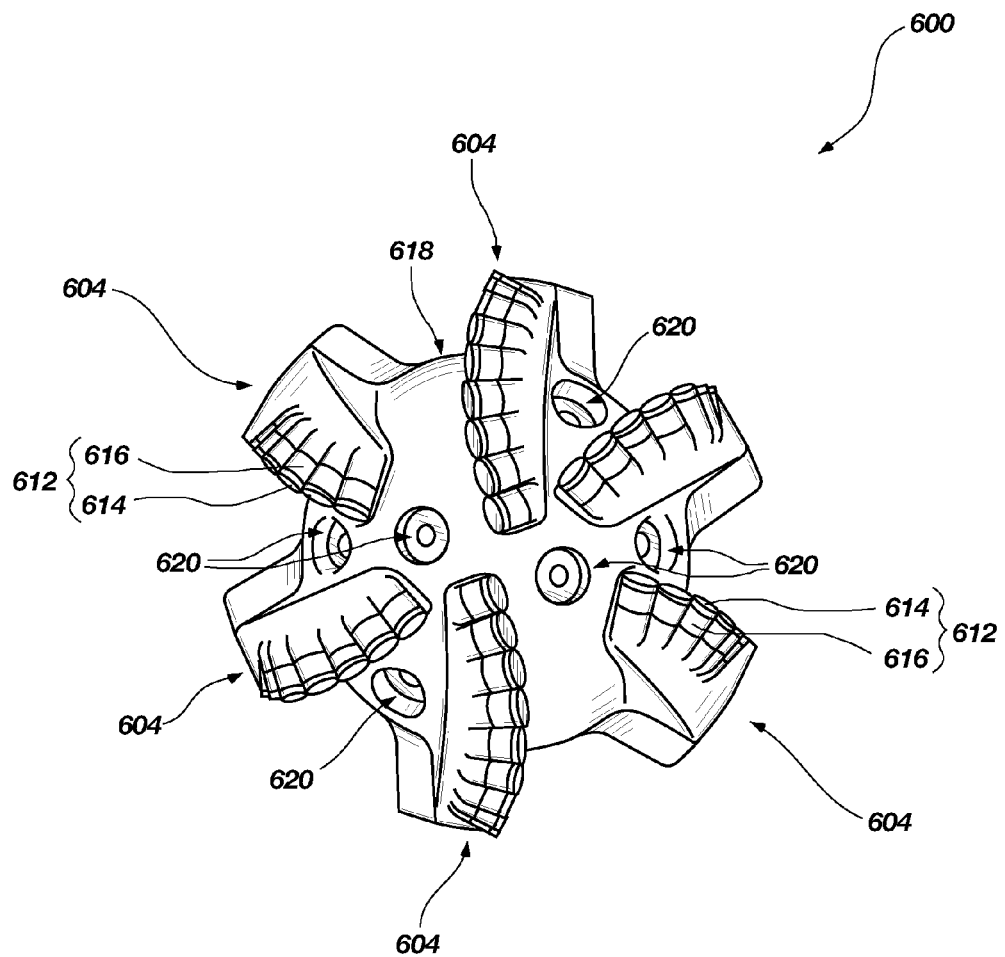
FIG. 6B is a top elevation view of the rotary drill bit shown in FIG. 6A.

FIG. 6A is an isometric view and FIG. 6B is a top elevation view of an embodiment of a rotary drill bit 600. The rotary drill bit 600 includes at least one PDC configured according to any of the previously described PDC embodiments. The rotary drill bit 600 comprises a bit body 602 that includes radially and longitudinally extending blades 604 having leading faces 606, and a threaded pin connection 608 for connecting the bit body 602 to a drilling string. The bit body 602 defines a leading end structure for drilling into a subterranean formation by rotation about a longitudinal axis 610 and application of weight-on-bit. At least one PDC cutting element, configured according to any of the previously described PDC embodiments (e.g., the PDC 300 shown in FIG. 3), may be affixed to the bit body 602. With reference to FIG. 6B, a plurality of PDCs 612 are secured to the blades 604. For example, each PDC 612 may include a PCD table 614 bonded to a substrate 616. More generally, the PDCs 612 may comprise any PDC disclosed herein, without limitation. In addition, if desired, in some embodiments, a number of the PDCs 612 may be conventional in construction. Also, circumferentially adjacent blades 604 define so-called junk slots 618 therebetween, as known in the art. Additionally, the rotary drill bit 600 may include a plurality of nozzle cavities 620 for communicating drilling fluid from the interior of the rotary drill bit 600 to the PDCs 612.

In the illustrated embodiment shown in FIGS. 6A and 6B, each PDC 612 is shown as a compact having a polycrystalline diamond table bonded to a substrate. However, in other embodiments, one or more of the PDCs 612 may be replaced by a PCD element (e.g., the PCD element 100 shown in FIG. 1) that is brazed to the bit body 602. In such an embodiment, the braze alloy infiltrates into and fills the interstitial regions of the second volume 110 of the PCD body 102 so that a strong metallurgical bond is formed between the bit body 602 and the PCD element.

FIGS. 6A and 6B merely depict an embodiment of a rotary drill bit that employs at least one cutting element comprising a PDC or PCD element fabricated and structured in accordance with the disclosed embodiments, without limitation. The rotary drill bit 600 is used to represent any number of earth-boring tools or drilling tools, including, for example, core bits, roller-cone bits, fixed-cutter bits, eccentric bits, bicenter bits, reamers, reamer wings, or any other downhole tool including PDCs or PCD elements, without limitation.

The PCD elements and PDCs disclosed herein (e.g., the PDC 300 shown in FIG. 3) may also be utilized in applications other than rotary drill bits. For example, the disclosed PCD element and PDC embodiments may be used in thrust-bearing assemblies, radial bearing assemblies, wire-drawing dies, artificial joints, machining elements, and heat sinks.

Figure 7:
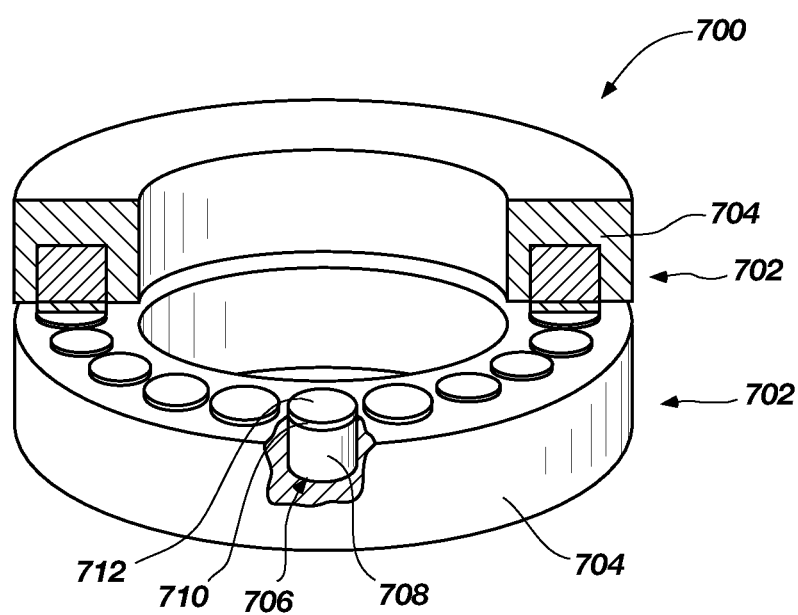
FIG. 7 is an isometric cut-away view of an embodiment of a thrust-bearing apparatus that may utilize one or more of the disclosed PDC/PCD element embodiments.

FIG. 7 is an isometric cut-away view of an embodiment of a thrust-bearing apparatus 700, which may utilize any of the disclosed PDC embodiments as bearing elements. The thrust-bearing apparatus 700 includes respective thrust-bearing assemblies 702. Each thrust-bearing assembly 702 includes an annular support ring 704 that may be fabricated from a material, such as carbon steel, stainless steel, or another suitable material. Each support ring 704 includes a plurality of recesses (not labeled) that receives a corresponding bearing element 706. Each bearing element 706 may be mounted to a corresponding support ring 704 within a corresponding recess by brazing, press-fitting, using fasteners, or another suitable mounting technique. One or more, or all of bearing elements 706 may be configured according to any of the disclosed PDC embodiments. For example, each bearing element 706 may include a substrate 708 and a PCD table 710, with the PCD table 710 including a bearing surface 712.

In use, the bearing surfaces 712 of one of the thrust-bearing assemblies 702 bears against the opposing bearing surfaces 712 of the other one of the bearing assemblies 702. For example, one of the thrust-bearing assemblies 702 may be operably coupled to a shaft to rotate therewith and may be termed a "rotor." The other one of the thrust-bearing assemblies 702 may be held stationary and may be termed a "stator."

Referring to FIG. 8, the thrust-bearing apparatus 700 may be incorporated in a subterranean drilling system. FIG. 8 is a schematic isometric cut-away view of a subterranean drilling system 800 that includes at least one of the thrust-bearing apparatuses 700 shown in FIG. 7 according to another embodiment. The subterranean drilling system 800 includes a housing 802 enclosing a downhole drilling motor 804 (i.e., a motor, turbine, or any other device capable of rotating an output shaft) that is operably connected to an output shaft 806. A first thrust-bearing apparatus $700_1$ (FIG. 7) is operably coupled to the downhole drilling motor 804. A second thrust-bearing apparatus $700_2$ (FIG. 7) is operably coupled to the output shaft 806. A rotary drill bit 808 configured to engage a subterranean formation and drill a borehole is connected to the output shaft 806. The rotary drill bit 808 is shown as a roller-cone bit including a plurality of roller cones 810. However, other embodiments may utilize different types of rotary drill bits, such as a so-called "fixed-cutter" drill bit shown in FIGS. 6A and 6B. As the borehole is drilled, pipe sections may be connected to the subterranean drilling system 800 to form a drill string capable of progressively drilling the borehole to a greater depth within the earth.

A first one of the thrust-bearing assemblies 702 of the thrust-bearing apparatus $700_1$ is configured as a stator that does not rotate and a second one of the thrust-bearing assemblies 702 of the thrust-bearing apparatus $700_1$ is configured as a rotor that is attached to the output shaft 806 and rotates with the output shaft 806. The on-bottom thrust generated when the drill bit 808 engages the bottom of the borehole may be carried, at least in part, by the first thrust-bearing apparatus $700_1$. A first one of the thrust-bearing assemblies 702 of the thrust-bearing apparatus $700_2$ is configured as a stator that does not rotate and a second one of the thrust-bearing assemblies 702 of the thrust-bearing apparatus $700_2$ is configured as a rotor that is attached to the output shaft 806 and rotates with the output shaft 806. Fluid flow through the power section of the downhole drilling motor 804 may cause what is commonly referred to as "off-bottom thrust," which may be carried, at least in part, by the second thrust-bearing apparatus $700_2$.

In operation, drilling fluid may be circulated through the downhole drilling motor 804 to generate torque and effect rotation of the output shaft 806 and the rotary drill bit 808 attached thereto so that a borehole may be drilled. A portion of the drilling fluid may also be used to lubricate opposing bearing surfaces of the bearing elements 706 of the thrust-bearing assemblies 702.

FIG. 9 is a side cross-sectional view of an embodiment of a wire-drawing die 900 that employs a PDC 902 fabricated in accordance with the teachings described herein. The PDC 902 includes an inner, annular PCD region 904 comprising any of the PCD tables described herein that is bonded to an outer cylindrical substrate 906 that may be made from the same materials as the substrate 308 shown in FIG. 3. The PCD region 904 also includes a die cavity 908 formed therethrough configured for receiving and shaping a wire being drawn. The wire-drawing die 900 may be encased in a housing (e.g., a stainless steel housing), which is not shown, to allow for handling. In use, a wire 910 of a diameter $d_1$ is drawn through die cavity 908 along a wire drawing axis 912 to reduce the diameter of the wire 910 to a reduced diameter $d_2$.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A method of fabricating a thermally-stable polycrystalline diamond element, comprising:

providing an at least partially leached polycrystalline diamond body including a plurality of interstitial regions therein; and infiltrating at least a portion of the interstitial regions of the at least partially leached polycrystalline diamond body with at least a portion of an infiltrant material, wherein the infiltrant material includes at least one member selected from the group consisting of a ceramic having a negative coefficient of thermal expansion, glass, and silicone.

2. The polycrystalline diamond element of claim 1 wherein the at least one member is glass, and further wherein the glass is selected from the group consisting of a silicate, a borate, a borosilicate, and combinations thereof.

3. The polycrystalline diamond element of claim 1 wherein the at least one member is silicone.

4. The polycrystalline diamond element of claim 1 wherein the at least one member is a ceramic having a negative coefficient of thermal expansion, and further wherein the ceramic is selected from zirconium tungstate, beta spodumene, beta eucryptite, and combinations thereof.

5. The method of claim 1 wherein infiltrating at least a portion of the interstitial regions of the at least partially leached polycrystalline diamond body with at least a portion of an infiltrant material comprises subjecting the infiltrant material and the at least partially leached polycrystalline diamond body to a high-pressure/high-temperature process.

6. The method of claim 1 wherein infiltrating at least a portion of the interstitial regions of the at least partially leached polycrystalline diamond body with at least a portion of an infiltrant material comprises subjecting the infiltrant material and the at least partially leached polycrystalline diamond body to a hot isostatic pressing process.

7. A method of fabricating a thermally-stable polycrystalline diamond element, comprising:
    assembling an infiltrant material adjacent to an at least partially leached polycrystalline diamond body including a plurality of interstitial regions therein, wherein the infiltrant material exhibits a negative coefficient of thermal expansion; and
    infiltrating at least a portion of the infiltrant material into a portion of the interstitial regions of the at least partially leached polycrystalline diamond body.

8. The method of claim 7 wherein the infiltrant material comprises at least one ceramic exhibiting the negative coefficient of thermal expansion.

9. The method of claim 7 wherein the infiltrant material comprises at least one ceramic selected from the group consisting of zirconium tungstate, beta spodumene, and beta eucryptite.

10. The method of claim 7 wherein the infiltrant material comprises zirconium tungstate.

11. The method of claim 7 wherein the infiltrant material comprises beta spodumene.

12. The method of claim 7 wherein the infiltrant material comprises beta eucryptite.

13. The method of claim 7 wherein the negative coefficient of thermal expansion of the infiltrant material is negative over a temperature range from about −272° C. to about 775° C.

14. The method of claim 7 wherein the infiltrant material is non-catalytic relative to diamond.

15. The method of claim 7, further comprising:
    wherein assembling an infiltrant material adjacent to an at least partially leached polycrystalline diamond body including a plurality of interstitial regions comprises positioning the at least partially leached polycrystalline diamond body between the infiltrant material and a substrate including a metallic infiltrant material therein; and
    infiltrating a portion of the metallic infiltrant material into another portion of the interstitial regions of the at least partially leached polycrystalline diamond body.

16. The method of claim 7 wherein infiltrating at least a portion of the infiltrant material into only a portion of the interstitial regions of the at least partially leached polycrystalline diamond body comprises subjecting the infiltrant material and the at least partially leached polycrystalline diamond body to a high-pressure/high-temperature process.

17. A method of fabricating a thermally-stable polycrystalline diamond compact, comprising:
    assembling an infiltrant material with an at least partially leached polycrystalline diamond body including a plurality of interstitial regions therein, wherein the infiltrant material exhibits a negative coefficient of thermal expansion; and
    subjecting the infiltrant material and the at least partially leached polycrystalline diamond body to a high-pressure/high-temperature process effective to infiltrate a portion of the interstitial regions of the at least partially leached polycrystalline diamond table with at least a portion of the infiltrant material.

18. The method of claim 17 wherein the negative coefficient of thermal expansion of the infiltrant material is negative over a temperature range from about −272° C. to about 775° C.

19. The method of claim 17 wherein the infiltrant material comprises at least one ceramic exhibiting the negative coefficient of thermal expansion.

20. The method of claim 17 wherein the infiltrant material comprises at least one ceramic selected from the group consisting of zirconium tungstate, beta spodumene, and beta eucryptite.

21. The method of claim 17 wherein the infiltrant material comprises zirconium tungstate.

22. The method of claim 17 wherein the infiltrant material comprises beta spodumene.

23. The method of claim 17 wherein the infiltrant material comprises beta eucryptite.

24. The method of claim 17, further comprising:
    wherein assembling an infiltrant material with an at least partially leached polycrystalline diamond body including a plurality of interstitial regions comprises positioning the infiltrant material and the at least partially leached polycrystalline diamond body between a substrate including a metallic infiltrant material therein adjacent; and
    infiltrating a portion of the metallic infiltrant material into another portion of the interstitial regions of the at least partially leached polycrystalline diamond body.

25. The method of claim 17 wherein the at least partially leached polycrystalline diamond body is bonded to a substrate prior to the act of infiltrating.

* * * * *